(No Model.)
G. P. SALISBURY.
CAR STARTER.
No. 268,545. Patented Dec. 5, 1882.
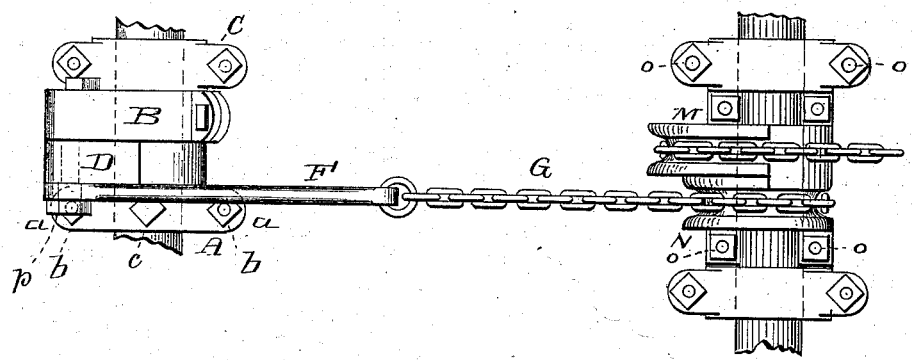
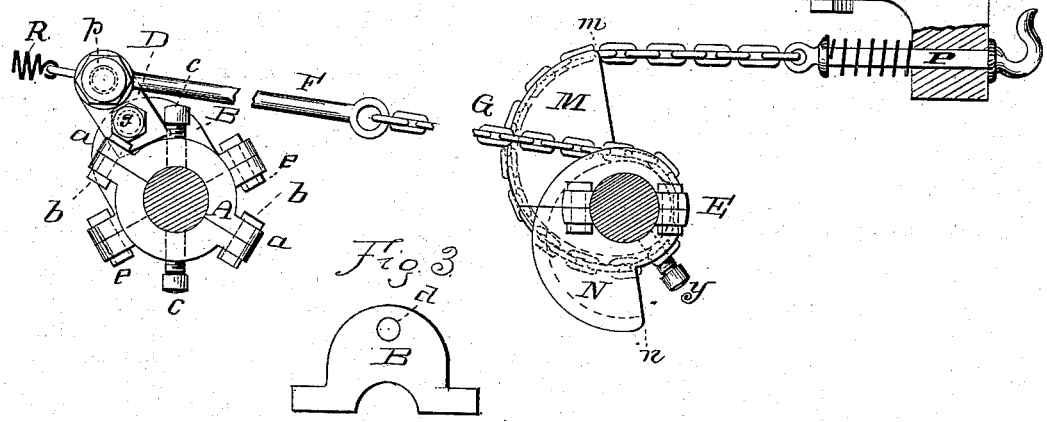
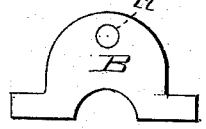
Witnesses
George Terry
Hiram A. Gray
Inventor
George P. Salisbury

UNITED STATES PATENT OFFICE.

GEORGE P. SALISBURY, OF NEW HAVEN, CONNECTICUT.

CAR-STARTER.

SPECIFICATION forming part of Letters Patent No. 268,545, dated December 5, 1882.

Application filed August 18, 1882. (No model.)

*To all whom it may concern:*

Be it known that I, GEORGE P. SALISBURY, a citizen of the United States of America, residing at New Haven, in the county of New Haven and State of Connecticut, have invented certain new and useful Improvements in Car-Starters, of which the following is a specification, reference being had therein to the accompanying drawings, in which—

Figure 1 is a plan view of the starter arranged on the axles of a car which are represented as broken off. Fig. 2 is a side view of the device, and Fig. 3 shows the piece to which the clutch is attached.

As ordinarily constructed, street-cars have small wheels, which are fastened on parallel axles journaled in boxes which are immovably fixed to the body of the car. The result is that the friction on all the journals must be overcome at the same instant to start the car, and a strong pull is required. The object of my invention is to lessen the pull required.

To this end the improvement consists in arranging on one of the car-axles a clutch, which is connected to cams arranged on the other axle and to the draw-bar, as the contrivance is explained more fully hereinafter and claimed.

To enable others to make my improved starter so that it will operate in the way contemplated, I will give a detailed description of the same.

A is a circular collar made in two parts, and which forms a part of a clutch, and is of sufficient width to make room for the projections $a$, and yet leave a circular part. The bolts $b$ pass through the projections to hold the parts together. The set-screws $c$ between the projections cause it to revolve with the axle.

The part B is made in two unlike pieces, the forms of which are shown in Fig. 3. The larger piece has the bolt-hole $d$, and the pieces are held together by the bolts $e$ passing through projections on the pieces. The part B is fitted to and is free to turn on the axle.

The circular collar C is made in two parts, and has projections through which bolts pass to hold the parts together. It is clamped to the axle; or a set-screw may pass through it to cause it to revolve with the axle. Its function is to hold the part B in position.

The clutch D has its upper end rounded, and its lower end is inclined as to its sides. Through its lower part a bolt, $g$, on which it is free to turn, passes, and it also passes through the part B, and is secured by the nut $h$.

The cam E is a double cam, is made in two parts, M and N, and approximates a semicircle in form. A spiral groove adapted to receive a chain extends from the point $m$ to the point $n$. The part M diminishes in size from the point $m$ to a line drawn between the points $m$ and $n$, and then becomes circular. The part N meeting the circular part of M is also circular until it reaches a line drawn between the points $m$ and $n$, and then increases in size from said line to the point $n$. Projections are formed on the parts M and N, through which the bolts $o$ pass to hold the parts together.

The bar F has one of its ends enlarged and perforated. Through the perforation the bolt $p$, on which the bar is free to turn, passes into the clutch D. Through the other end of the bar a link of the chain G passes, and the chain passes round the cam E in the groove, as shown, making a complete turn, and is attached to the draw-bar P. A screw, $y$, passes through a link of the chain into the cam E to hold the chain in place on the cam. The spring R is attached to one end of the bar F and to the body of the car to draw the parts back and hold them in a position in which they will act.

The construction of some of the parts of my device may be varied and the invention remain the same. For example, any suitable clutch may be used, and a chain may take the place of the connecting rod or bar F.

Having fully described my improvement, what I claim as new, and desire to secure by Letters Patent, is—

The car-starter herein described, consisting essentially of the collar A, part B, collar C, clutch D, double cam E, connecting-rod F, chain G, draw-bar P, and spring R, all the said parts constructed and combined substantially as shown and set forth.

In testimony whereof I affix my signature in presence of two witnesses.

GEORGE P. SALISBURY.

Witnesses:
GEORGE TERRY,
HIRAM A. GRAY.